United States Patent [19]

Ackeret

[11] Patent Number: 4,546,561

[45] Date of Patent: Oct. 15, 1985

[54] PICTURE VIEWER

[75] Inventor: Peter Ackeret, Küsnacht, Switzerland

[73] Assignee: Licinvest AG, Chur, Switzerland

[21] Appl. No.: 560,384

[22] Filed: Dec. 12, 1983

[30] Foreign Application Priority Data

Dec. 13, 1982 [DE] Fed. Rep. of Germany ....... 3246101

[51] Int. Cl.⁴ .............................................. G09F 11/30
[52] U.S. Cl. ...................................... 40/513; 40/490; 40/511; 40/380
[58] Field of Search ............... 40/10 R, 513, 511, 490, 40/375, 380, 381

[56] References Cited

U.S. PATENT DOCUMENTS

| | | | |
|---|---|---|---|
| 535,635 | 3/1895 | Stone ..................... | 40/509 |
| 2,867,051 | 1/1959 | Taylor ..................... | 40/509 |
| 2,919,509 | 1/1960 | Strandberg ............. | 40/63 |
| 3,377,727 | 4/1968 | Weggeland ............. | 40/79 |
| 3,878,632 | 4/1975 | Berggren et al. ....... | 40/152 |
| 4,057,920 | 11/1977 | Weggeland ............. | 40/79 |
| 4,173,838 | 11/1979 | Antos ..................... | 40/366 |
| 4,238,899 | 12/1980 | Ackeret ................. | 40/490 |
| 4,241,528 | 12/1980 | Ackeret ................. | 40/513 |
| 4,241,529 | 12/1980 | Baur ....................... | 40/490 |
| 4,242,817 | 1/1981 | Ballard ................... | 40/152.1 |
| 4,242,820 | 1/1981 | Ackeret ................. | 40/490 |
| 4,245,417 | 1/1981 | Ackeret ................. | 40/513 |
| 4,259,802 | 4/1981 | Ackeret ................. | 40/490 |
| 4,376,348 | 3/1983 | Ackeret ................. | 40/490 |
| 4,413,435 | 11/1983 | Baur ....................... | 40/155 |
| 4,458,434 | 7/1984 | Ackeret ................. | 40/513 |

FOREIGN PATENT DOCUMENTS

| | | |
|---|---|---|
| 1772198 | 1/1971 | Fed. Rep. of Germany . |
| 2212135 | 11/1972 | Fed. Rep. of Germany . |
| 2457759 | 6/1976 | Fed. Rep. of Germany . |
| 2742345 | 3/1979 | Fed. Rep. of Germany . |
| 490390 | 8/1954 | Italy . |
| 629845 | 12/1961 | Italy ........................... 40/107 |
| 1059689 | 2/1967 | United Kingdom . |
| 1339678 | 12/1973 | United Kingdom . |
| 1402062 | 8/1975 | United Kingdom . |

*Primary Examiner*—Gene Mancene
*Assistant Examiner*—Wenceslao J. Contreras

[57] ABSTRACT

Disclosed is a picture viewer for viewing a stack of pictures sequentially through a viewing window. The picture viewer comprises a housing member, a slider member, a bias means for urging the stack of pictures against the viewing window, and an exchange means for sequentially changing the picture that is presented at the viewing window. The exchange means comprises: (a) a retentive element to hold one picture in the housing member when the slider member is moved out of the housing member and (b) a separator bar which pushes the remainder of the stack out of the housing when the slider member is moved out of the housing. Alignment means are provided to maintain the separated picture in alignment with the remainder of the stack so that jamming does not occur when the separated picture is returned to the stack.

13 Claims, 15 Drawing Figures

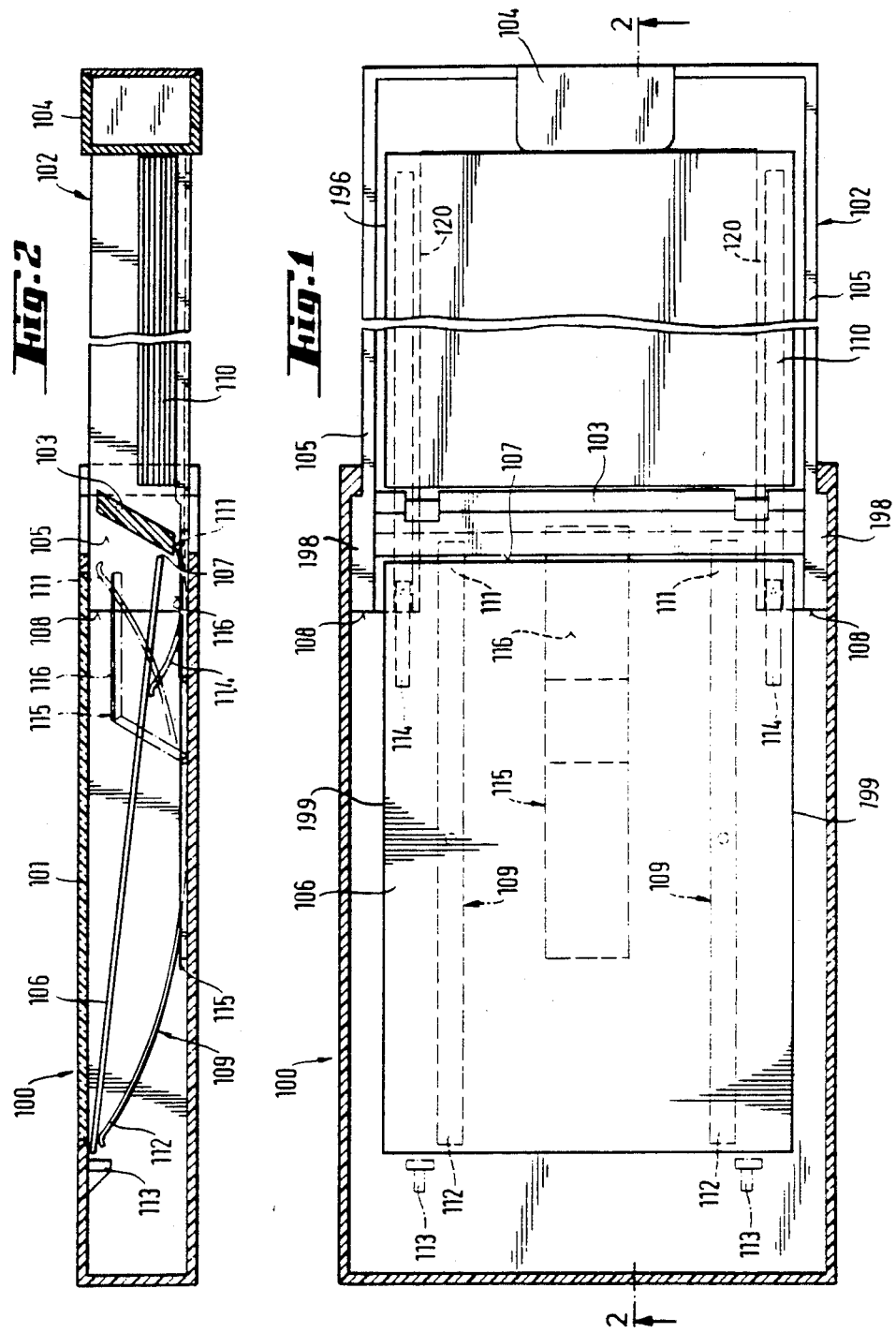

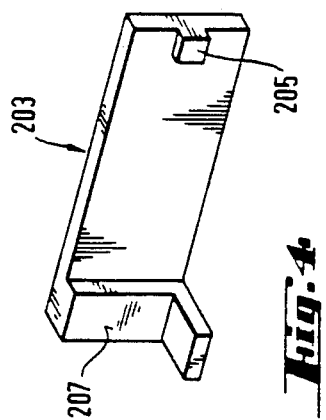
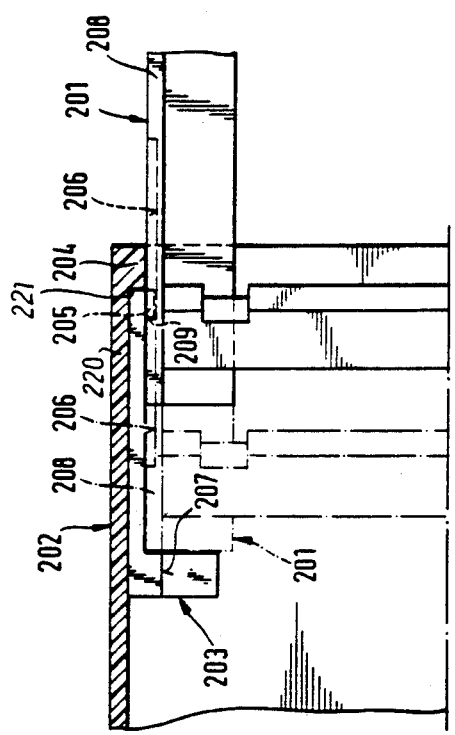

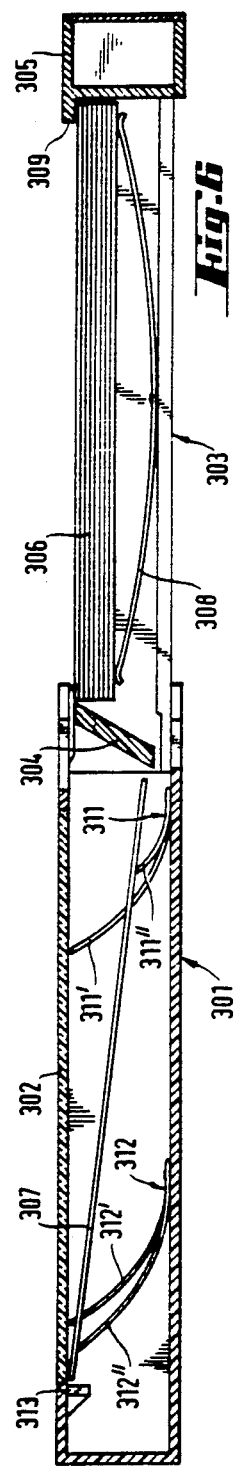
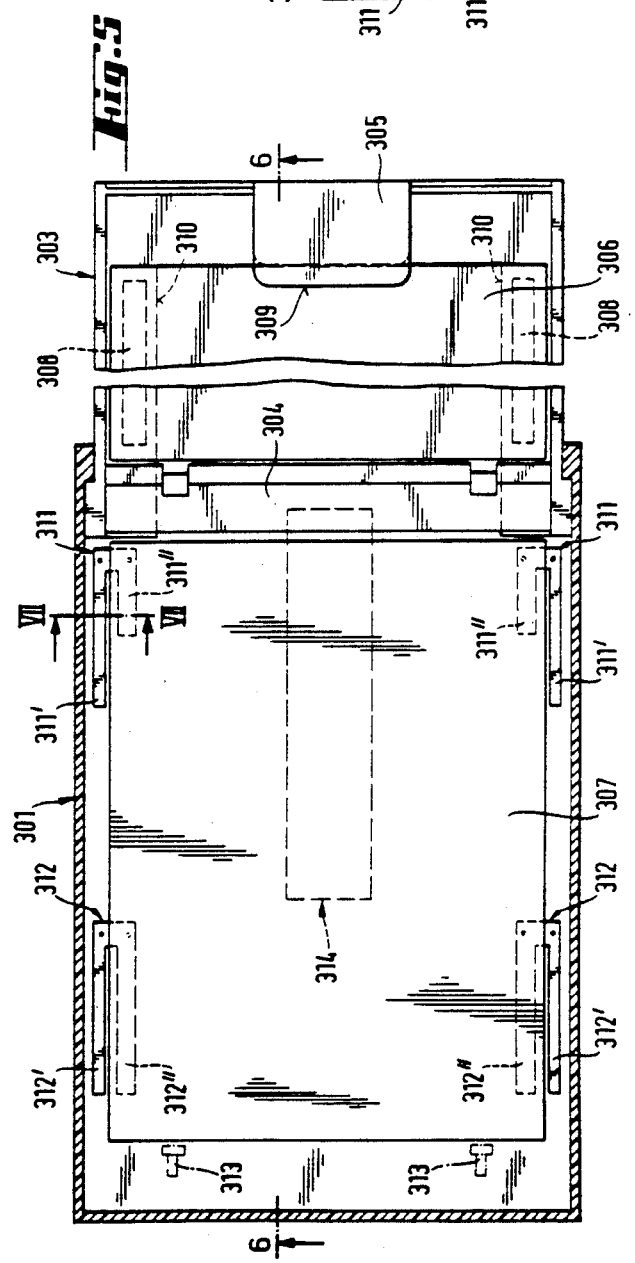

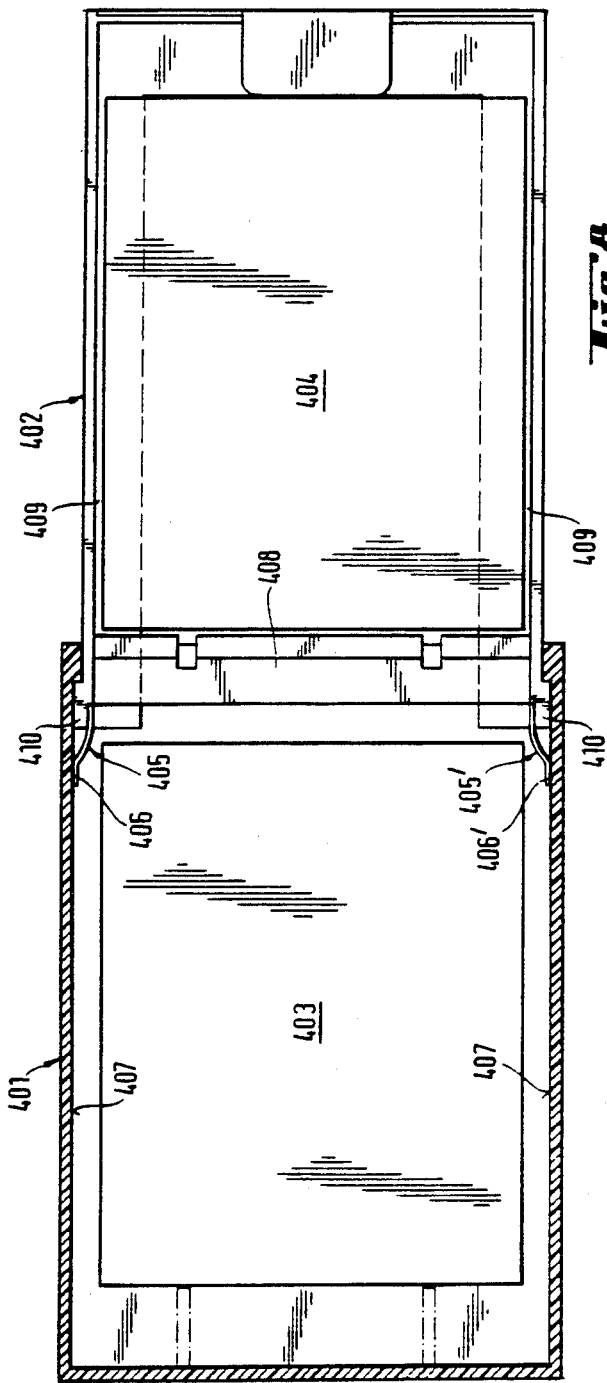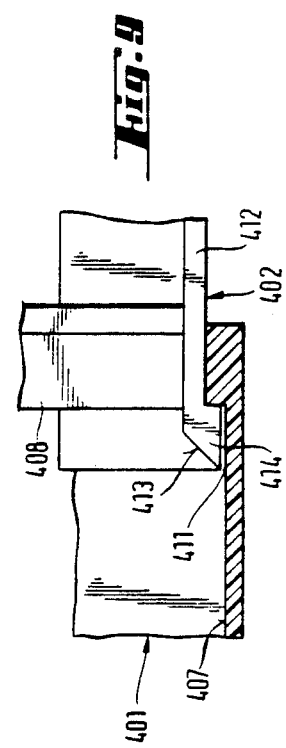

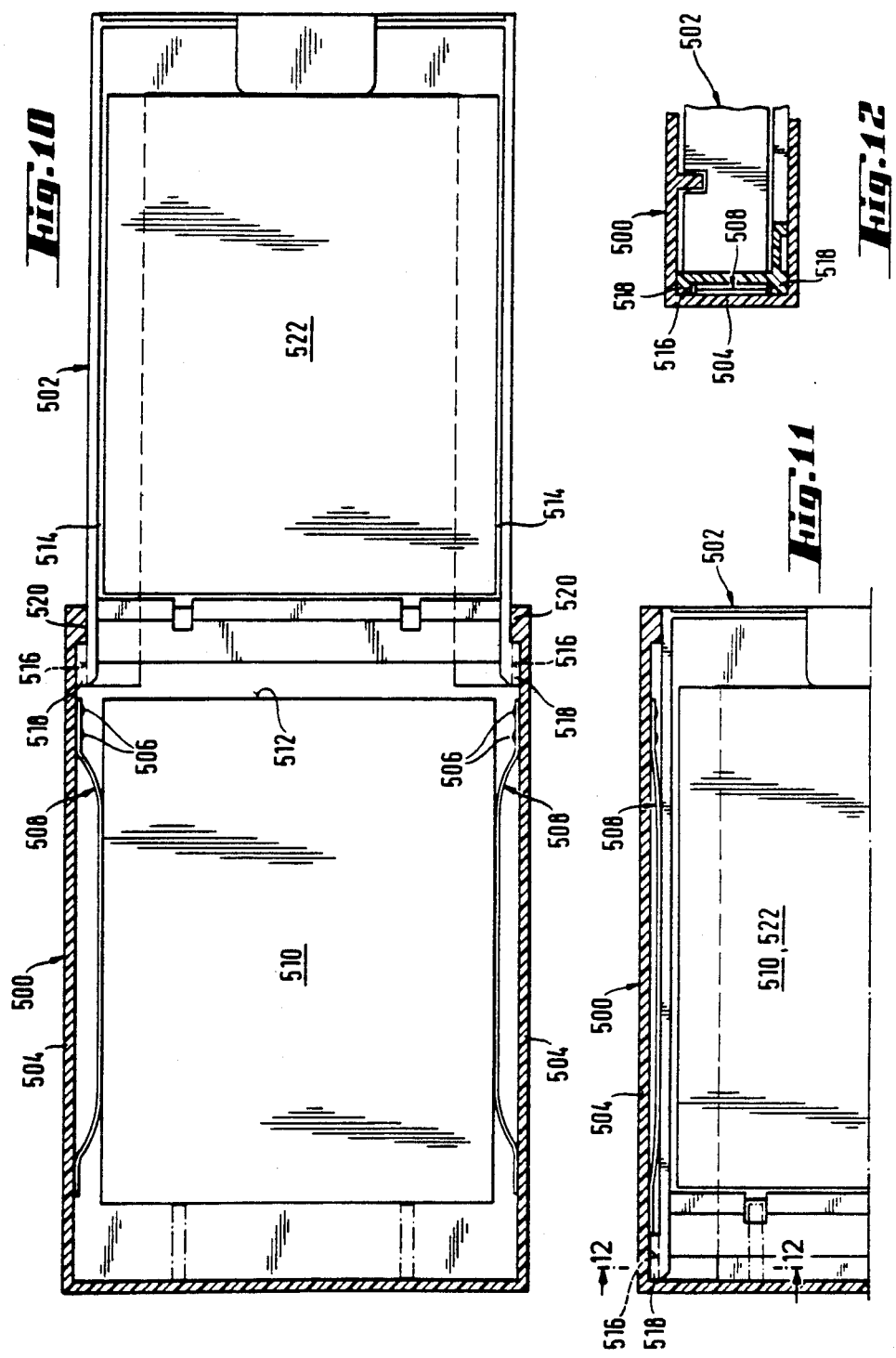

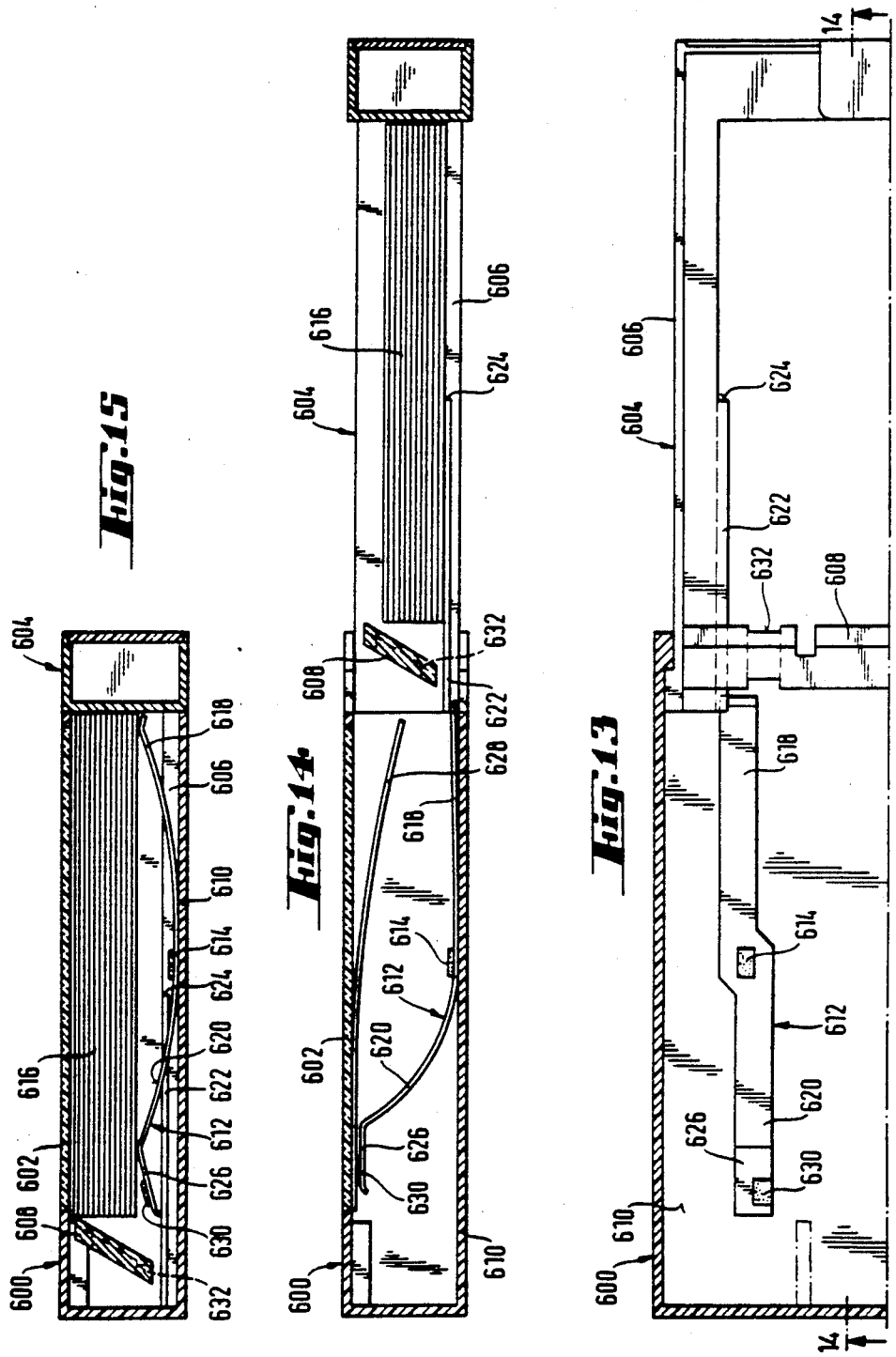

PICTURE VIEWER

BACKGROUND OF THE INVENTION

The present invention relates to a picture viewer, in particular a photographic print viewer.

U.S. Pat. Nos. 4,245,417, 4,241,529, and 4,259,802 disclose picture viewers comprising a housing with a viewing window and a slider that, in use, is reciprocated into and out of the housing parallel to the plane of the window. The housing is adapted to receive a stack of pictures which are urged against the window by a bias means, e.g., a spring.

The slider, together with the retentive element and separator bar described below, functions to move the pictures in the stack sequentialy into and out of position to be viewed through the viewing window. When the slider is pushed fully into the housing, the uppermost picture of the stack of pictures may be viewed through the window. By moving the slider out of the housing, either the top or bottom picture of the stack is removed from the stack. The picture that is removed from the stack in this manner (the "separated picture") is returned to the opposite end of the stack from which it was removed to the stack by moving the slider back into the housing. By repeatedly reciprocating the slider into and out of the housing in this manner, a cyclic exchange of the picture presented at the window of the housing is achieved.

Means to implement this cyclic exchange comprises two additional elements, i.e., a separator bar and a retentive element. The separator bar extends acros the stack of pictures in the housing. On the outward stroke of the slider, the separator bar pushes all but the top or bottom picture in the stack out of the housing. That top or bottom picture is engaged by the retentive element on the outward stroke of the slider to separate that picture from the stack.

On the outward and return strokes of the slider, the separator bar passes first over and then under the separated picture, or vice versa, depending on whether the top or bottom picture in the stack is removed from the stack on the outward stroke. Appropriate spaces are, therefore, provided above and below the separator bar to accommodate the separated picture on the outward and return strokes of the slider.

The reciprocation of the slider back and forth in the above manner can cause abrupt movement of the pictures in the viewer. One consequence of such abrupt movement is that the picture that is removed from the stack of pictures when the slider is moved outwardly may become misaligned with respect to the remainder of the stack of pictures. When such misalignment occurs, there is a risk that when the user moves the slider back into the housing the exchange mechanism will become jammed and that the picture will be damaged as a result of such jamming.

SUMMARY OF THE INVENTION

It is an object of the present invention to provide an improved picture viewer of the type described above in which the possibility of picture misalignment is reduced.

This is achieved in the present invention by providing means in the picture viewer to align the separated picture with the "passage path" of the separator bar.

In particular, the picture viewer of the present invention comprises, inter alia, a housing member and a slider member. The housing member adapted to accommodate a stack of pictures of substantially equal size and has a top wall, a bottom wall opposite the top wall, side walls, a rear end wall, and an open front end. The top wall of the housing member includes a viewing window through which the top picture in the stack of pictures is viewed.

The slider member is adapted to be moved into and out of the open front end of the housing member parallel to the plane of its viewing window. A bias means (e.g., a spring) is mounted in the picture viewer to urge the topmost picture in the stack into position for viewing when the slider member is moved into the housing member.

The picture viewer of the present invention also includes a picture exchange means which cooperates with other structure in the picture viewer to achieve a cyclic exchange of pictures to be viewed through the viewing window. This picture exchange means includes (a) a separator bar adapted to move pictures in the stack of pictures out of the housing member when the slider is moved out of that member, and (b) a retentive element adapted to engage either the top or bottom picture in the stack of pictures in the housing member to retain the first picture in the housing member when the slider is moved outwardly. The separator bar and retentive element cooperate with the other structure in the picture viewer so that, in use, when the slider member is moved out of the housing member, the top or bottom picture is separated from the stack of pictures and, when the slider member is moved back into the housing member, the first picture is returned to the opposite end of the stack from which it was separated.

The previously mentioned alignment means functions to align the lateral edges of the picture that is separated from the stack of pictures with the lateral edges of the pictures remaining in the stack so that upon the return stroke of the slider member the first picture is returned to the stack of pictures without jamming of the picture viewer. As will be described in more detail in connection with the description of the preferred embodiments, this alignment can be accomplished by a number of different means, including: (a) side walls of the slider member which are adapted to engage the side walls of the separated picture; (b) spring members which may be mounted on either the bottom or sides of the housing member and which are adapted to engage the side walls of the separated picture; (c) leaf springs that extend from the slider member and are adapted to define a channel that aligns the separated picture on the return stroke of the slider; and (d) clamping means adapted to hold the separated picture in alignment with the pictures remaining in the stack.

BRIEF DESCRIPTION OF THE DRAWINGS

FIG. 1 is a top plan view of a first embodiment of my invention.

FIG. 2 is a sectional view of the device shown in FIG. 1, taken along line 2—2.

FIG. 3 illustrates a detail of a modification of the first embodiment of my invention.

FIG. 4 is a perspective view of a component shown in FIG. 3.

FIG. 5 is a top plan view of a second embodiment of my invention.

FIG. 6 is a sectional view of the device shown in FIG. 5, taken along line 6—6.

FIG. 7 is a sectional view taken along line 7—7 in FIG. 5, when the slider is moved into the housing of the picture viewer.

FIG. 8 is a top plan view, with certain details not shown, of a third embodiment of my invention.

FIG. 9 illustrates a detail of a modification of the third embodiment of my invention.

FIG. 10 is a top plan view, with certain details not shown, of a fourth embodiment of my invention.

FIG. 11 illustrates the picture viewer of FIG. 10, partly broken away, in its closed state.

FIG. 12 is a partial sectional view taken along line 12—12 of FIG. 11.

FIG. 13 is a top plan view of a fifth embodiment, partly broken away.

FIG. 14 is a sectional view taken along line 14—14 of FIG. 13.

FIG. 15 shows the picture viewer of FIG. 14 in its closed position.

DETAILED DESCRIPTION OF THE PREFERRED EMBODIMENTS

FIGS. 1 and 2 show a first embodiment of the picture viewer of my invention. The picture viewer comprises a housing 100 and a drawer or slider 102 which is mounted for longitudinal movement into and out of the housing. In FIGS. 1 and 2, the slider 102 is shown in a position where it has been moved out of the housing.

Housing 100 has an open end (the right end shown in FIGS. 1 and 2) through which slider 102 may be moved. When the slider is moved into the housing, the top picture of a stack of pictures in the housing, may be viewed through the housing's viewing window 101.

Slider 102 is of a generally frame-like configuration, with a separator bar 103 mounted between its lateral walls 105. The slider includes struts 120 to support a stack of pictures 110.

The separator bar 103 and a retentive element 115 disposed on the housing bottom (and which will be described in more detail below) serve to separate a bottom picture 106 from the stack of pictures 110 when the slider is moved out of the housing. Movement of the slider out of the housing is facilitated by a grip 104 provided on the slider member.

As can be seen from FIG. 1, the innermost ends of lateral walls 105 of the slider extend on both sides of the separator bar 103 to form extensions 198. As can also be seen from FIG. 1, these lateral walls may then engage lateral edges 199 of the separated picture 106 as well a the lateral edges 196 of the pictures in the stack of pictures. Thus, lateral walls 105 of the slider function to keep the lateral edges 199 of the separated picture 106 in alignment with the lateral edges 196 of the pictures remaining in the stack when the slider is withdrawn from the housing. As a result, when slider 102 is pushed into the housing 100, edge 107 of picture 106 cannot collide with inner ends 108 of the slider walls 105.

When slider 102 is moved into housing 100, two leaf springs 109, which are mounted on the bottom of the housing, urge a stack of pictures 110 against the window 101. When slider 102 is moved out of the housing, however, the front ends 111 of the springs 109 are suppressed by separator bar 103 while the rear ends 112 of the springs 109 are free to urge the rear end of separated picture 106 upwardly towards window 101. As can be seen from FIG. 1, when the rear end of the picture is urged upwardly in this manner it is moved into juxtaposition with stop members 113 provided in housing 100.

Two small auxiliary leaf springs 114 are also mounted on the bottom wall of housing 100. The free ends of springs 114 are released when slider 102 is moved out of housing 100, thereby lifting edge 107 of picture 106 slightly away from the housing bottom as shown in FIG. 2. Edge 107 is then in position to ride up the sloping surface of separator bar 103 until it reaches the top of that bar on the inward stroke of the slider. Continued inward movement of the slider causes the separator bar to be pushed underneath the picture with the result that when the slider 102 is pushed fully into housing 100, picture 106 becomes the uppermost picture in the stack.

The previously mentioned retentive element 115 comprises a pivotable spring-biased support having an adhesive coating 116. The function of the adhesive coating is to retain the lowermost picture in a stack of pictures in the housing, when the slider is moved out of the housing. On that outward movement of the slider, the remaining pictures in the stack in the housing are pushed out of the housing by separator bar 103. During the outward movement of the slider, the retentive element 115, including its adhesive coating 116, is pushed down by the separator bar to a flat position as depicted in FIGS. 1 and 2. The positions that the retentive element 115 and the front end 111 of the spring assume when slider 102 is pushed back into housing 100 (and when there are no pictures in the picture viewer) are shown by dashed lines in FIG. 2.

It will be noted that the design of the first embodiment requires that the housing 100 be longer than is needed to accommodate the pictures in it. This is because there must be room for the extensions 198 of walls 105 when slider 102 is moved into housing 100. A modified design that permits a housing closer in size to the pictures is illustrated in FIGS. 3 and 4.

FIG. 3 shows a portion of the modified design, with the slider 201 moved most of the way out of the housing 202. In the modified design, slider 201 has extensions 203 which are not integral with its side walls 208 as was the case with extensions 198 of side walls 105 in FIGS. 1-2. Rather, in the modified design, the extensions 203 are slideably received between the side walls 208 and the parallel side walls 220 of housing 202.

With the slider 201 pushed into the housing, extensions 203 will assume the position shown in solid lines in FIG. 3. When the slider is pushed out of the housing and near the end of the slider's outward stroke, leading edges 221 of extensions 203 will engage stop members 204 on the housing. Continued movement of the slider out of the housing will then result in the extensions 203 assuming the position shown in dashed lines in FIG. 3.

FIG. 4 shows a perspective view of the extension 203 used in the modified design depicted in FIG. 3. As shown, a protuberance 205 extends from extension 203. In use, this protuberance is positioned into and slides in a groove 206 in the side of wall 208 of the slider. The slider's outward stroke is limited by the engagement of protuberance 205 at the end edge 209 of groove 206, with the extension then assuming the position shown in dashed lines in FIG. 3. Surface 207 of extension 203 performs the same function as did extension 198 in the embodiment depicted in FIG. 1, that is, of keeping the lateral edges of the separated picture in alignment with the lateral edges of the pictures remaining in the stack when the slider is withdrawn from the housing.

FIGS. 5-15 depict additional embodiments of my invention. As will be made clear in the discussion below, these additional embodiments include structure that is also included in the first embodiment described above. For the sake of brevity, this common structure and its operation are not described in detail in connection with the descriptions of the additional embodiments below.

FIGS. 5, 6, and 7 show a second embodiment of the invention. Housing 301 is provided with window 302 and is adapted to accommodate a slider 303, which includes a separator bar 304 and a grip member 305. When the slider 303 is moved out of the housing as shown in FIGS. 5 and 6, a picture stack 306 is removed from the housing. Retention means 314 in housing 301 engages a bottom picture 307 in the housing, while the slider 303 is being withdrawn, to retain that picture in the housing.

Leaf springs 308 are mounted in slider 303. When the slider is pushed into the housing springs 308 urge the picture stack 306 (which then includes picture 307) against the housing's window 302. When the slider 303 is withdrawn from the housing 301, the stack of pictures 306 is held in the slider against the bias of springs 308 by protruding edges 309 of grip member 305 and by the front edge of housing 301, which extends slightly over the stack of pictures as shown in FIG. 6.

Alternatively, the stack of pictures may be held in the slider by the front edge of the housing and by pivotable flaps in their closed position at the front end of the slider. The pivotable flaps may be moved to an open position, for loading and unloading a stack of pictures into and out of the slider. A picture viewer housing such pivotable flaps is disclosed in my U.S. Pat. application Ser. No. 560,385, filed concurrently herewith the disclosure of which is incorporated herein by reference.

Within housing 301 and mounted on the bottom thereof are two pairs of double leaf springs 311 and 312. As seen in FIG. 5, each spring 312 has a symmetric U-shape and each spring 311 has an asymmetric U-shape, i.e., the inner leg 311" of spring 311 is slightly shorter than its outer leg 311'. With the slider pushed into the housing (FIG. 7), all legs of springs 311 and 312 are depressed by slider struts 310. Upon withdrawal of slider 303, the free ends of leaf springs 311 and 312 move into the positions shown in FIG. 6.

In the withdrawn position, the external or outer legs 311' and 312' extend alongside the lateral edges of picture 307 so that those lateral edges of the picture 307 are in alignment with the lateral edges of the pictures in the stack.

During slider withdrawal, the bottom picture 307 in the stack of pictures is retained in the housing by retention element 314. Also during picture withdrawal, spring legs 312"engage under picture 307 to lift the rear edge of picture 307 to a position in front of stop members 313. Spring legs 311" lift the front edge of picture 307 slightly to a level where picture 307 will be properly presented for engagement with the rear bevel of separator bar 304 when the slider is pushed into the housing.

FIG. 8 illustrates a third embodiment. As shown, a separated picture 403 is in housing 401, and a stack of pictures 404 is indicated by dashed lines in slider 402.

As shown in FIG. 8, leaf springs 405 and 405' are mounted at steps 410 of slider struts 409 adjacent to the inner end of the slider. The free ends 406 and 406' of leaf springs 405 and 405' are biased to engage inner surface 407 of the housing side walls. In use, on the inward stroke of slider 402 the leaf springs function to guide the separated picture 403 over separator bar 408 and onto the top of the stack of pictures by means of a "funnel" or channel formed by springs 405 and 405'.

A modification to the third embodiment is illustrated in FIG. 9. As shown, the inner ends of the slider struts 412 are chamfered to form a bevel 413. The bevel performs a function analogous to the function of the leaf springs in FIG. 8. However, because of the necessary clearance 411 between the housing and the slider, there remains a risk that when the separated picture is misaligned, a corner of that separated picture will be engaged by tip 414 with resultant jamming of the picture viewer and possible damage to the picture.

A fourth embodiment of my invention is illustrated in FIGS. 10, 11, and 12. As shown, a separated picture 510 is in housing 500 and a stack of pictures is indicated by dashed lines in slider 502. At lateral walls 504 of housing 500, there are mounted, by means of rivets 506, leaf springs 508 which, in their relaxed state (i.e., when the slider 502 has been withdrawn) assume the shape illustrated in FIG. 10. In the relaxed state, springs 508 engage the lateral edges of a separated picture 510. Thus, upon pushing slider 502 into housing 500, the leading edge 512 of picture 510 is aligned with the stack of pictures in slider 502.

When the slider 502 is pushed into the housing, springs 508 are depressed by slider struts 514. Slider struts 514 are provided with grooves 516 to accommodate springs 508 on the return stroke, as seen in FIG. 12. As shown in FIGS. 10 and 12, the inward ends of slider struts 514 have stop portions 518 that protrude outwardly and are adapted to engage with counter stops 520 of the housing 500 adjacent to the housing's opening in order to limit the withdrawal of the slider 502 out of the housing.

In the embodiments described above, the separated picture is laterally engaged and/or guided. In a fifth embodiment, however, alignment of the separated picture is maintained by clamping the separated picture when the slider is withdrawn from the housing.

The picture viewer of the fifth embodiment (FIGS. 13-15) may be of the same general configuration as the other embodiments. Housing 600 has a viewing window 602 and slider 604 has frame-like structure with longitudinal struts 606 joined at their inner ends by separator bar 608.

A pair of leaf springs 612 are mounted on the housing bottom 610. As may be best seen in FIGS. 14 and 15, housing bottom 610 has integrally formed therewith inwardly protruding extensions or mounting points 614 on which apertures provided in each leaf spring 612 are placed. Thereafter, the top ends of the extensions 614 are deformed to set the leaf springs in the housing. When the picture viewer is closed, the free ends of the leaf springs 612 produce a bias to urge a stack of pictures 616 against window 602 as shown in FIG. 15. The front end 618 of each leaf spring 612 is offset outwardly with respect to mounting point 614 while the rear end 620 of each spring is offset inwardly with respect to the mounting point.

Skids 622 extend inwardly from slider struts 606. The skids 622 and the leaf springs 612 are arranged and constructed with respect to each other so that when the slider is moved out from the housing, spring ends 618 are depressed (see FIGS. 13 and 14). However, skids 622 are cut off at 624 so that when the slider 604 is pushed into the housing, spring ends 618 are no longer restrained by the skids 622 and are free to support a stack of pictures in the housing.

Rear spring ends 620 have a distal portion 626 which is bent as shown in FIGS. 14 and 15 and on which is mounted high friction pad 630. In use, when the slider is moved outwardly, the bottom picture in the stack is separated from the remainder of the stack by a retentive element (not shown in the figures) and is clamped between the distal portion 626 of spring 620 and the window of the housing. The high friction pad 630 facilitates the clamping action.

As shown in FIG. 13, the high friction pad 630 preferably does not lie across the full width of leaf spring 612. The high friction pad is dimensioned in this manner to avoid interference which would otherwise result with separator bar 608 when the slider is moved back into the housing 600. During such movement, the separator bar functions to depress leaf spring end 620 to move it under the returning picture stack 616. The separator bar 608, however, is indented at its bottom at 632 as shown in FIG. 13 so that during its movement back into the housing the high friction pad 630 may pass through the indentation 632 without interfering with the movement of the separator bar.

Many details concerning the structure and operation of picture viewers of the general type of my invention are discussed in previously cited U.S. Pat. Nos. 4,245,417, 4,241,529, and 4,259,802. The disclosures of these patents are incorporated herein by reference.

It is to be understood that while the invention has been described with respect to preferred embodiments, variations and equivalents thereof may be perceived by those skilled in the art while nevertheless not departing from the scope of my invention as set forth in the claims appended hereto.

I claim:

1. A picture viewer comprising:
   (a) a housing member adapted to accommodate a stack of pictures of substantially equal size, the housing member having a top wall provided with a viewing window, a bottom wall opposite the top wall, side walls, a rear end wall, and an open front end;
   (b) a slider member adapted to be moved into and out of the open front end of the housing member parallel to the plane of the viewing window of the housing member;
   (c) bias means mounted in the picture viewer and adapted to urge the topmost picture of a stack of pictures in the housing member against the viewing window of the housing member;
   (d) picture exchange means comprising: (i) a separator bar adapted to move pictures in the stack of pictures out of the housing member when the slider is moved out of the housing member, and (ii) a retentive element adapted to engage a first picture in a stack of pictures in the housing member to retain the first picture in the housing member when the slider is moved out of the housing member, the first picture being at a first end of the stack of pictures, whereby, in use, when the slider member is moved out of the housing member, the first picture is separated from the stack of pictures and when the slider member is moved back into the housing member, the first picture is returned to a second end of the stack opposite to the first end; and
   (e) alignment means for aligning the first picture that is separated from the stack of pictures with the remainder of the stack of pictures so that upon the return stroke of the slider member the first picture is returned to the stack of pictures without jamming of the first picture in the picture viewer.

2. A picture viewer as set forth in claim 1 wherein the slider member has lateral walls and the alignment means comprises the inside surfaces of portions of said lateral walls which are adapted to engage the lateral edges of the first picture after it is separated and while it is being returned to the stack.

3. A picture viewer as set forth in claim 2 wherein the separator bar extends between the lateral walls of the slider member, the lateral walls extending in a first direction and a second direction from the separator bar, the lateral walls that extend in the first direction being adapted to engage the lateral edges of a stack of pictures in the slider when the slider is moved out of the housing member and the lateral walls that extend in the second direction being adapted to engage the lateral edges of a picture that is separated from the stack of pictures when the slider member is moved out of the housing member.

4. A picture viewer as set forth in claim 3 wherein the lateral walls that extend in the second direction are slideable relative to the separator bar and further wherein the picture viewer is arranged and constructed so that the lateral side walls that extend in the second direction are: (a) moved to an extended position relative to the separator member when the slider member is moved out of the housing member, and (b) moved to a retracted position relative to the separator bar when the slider member is moved into the housing member.

5. A picture viewer as set forth in caim 1 wherein the alignment means comprises leaf springs that extend inwardly into the interior of the housing member from lateral walls of the slider member when the slider member is withdrawn from the housing member, the leaf springs being shaped and adapted to define a channel to align the first picture in the housing member with a stack of pictures in the slider member when the slider member is moved from outside the housing member to inside the housing member.

6. A picture viewer as set forth in claim 1 wherein the alignment means comprises spring members which are adapted to engage the lateral edges of the first picture after it is separated and while it is being returned to the stack.

7. A picture viewer as set forth in claim 6 wherein the spring members are adapted to be depressed by the slider member when said slider member is pushed into said housing member.

8. A picture viewer as set forth in claim 7 wherein the spring members comprise leaf springs.

9. A picture viewer as set forth in claim 8 wherein the leaf springs are mounted on the bottom wall of the housing member.

10. A picture viewer as set forth in claim 8 wherein the leaf springs are mounted on the side walls of the housing member.

11. A picture viewer as set forth in claim 1 wherein the alignment means comprises clamping means adapted to hold the first picture in alignment with the stack when the slider member is moved out of the housing member.

12. A picture viewer as set forth in claim 11 wherein the clamping means is adapted to hold the first picture clamped against the top wall of the picture viewer.

13. A picture viewer as set forth in claim 12 wherein said bias means comprises leaf springs extending substantially parallel to the direction of slider reciprocation, each of said leaf springs having a first end and a second end for urging a stack of pictures against said viewing window, further wherein the clamping means comprises the ends of the leaf springs furthest remove from the open front end of the housing member.

* * * * *